US00RE38218E

(19) United States
(12) Reissued Patent
Vigor et al.

(10) Patent Number: US RE38,218 E
(45) Date of Reissued Patent: Aug. 19, 2003

(54) COMBINED PROCESS AND PLANT FOR PRODUCING COMPRESSED AIR AND AT LEAST ONE AIR GAS

(75) Inventors: Xavier Vigor, Chicago, IL (US); Patrice Ollivier, Paris (FR); Antoine Willemot, Gif-sur-Yvette (FR); Lionel Barry, Charenton-le-Pont (FR)

(73) Assignee: L'Air Liquide, Societe Anonyme pour l'Etude et l'Exploitation des Georges Claude, Paris Cedex (FR)

(21) Appl. No.: 10/142,064

(22) Filed: May 10, 2002

Related U.S. Patent Documents

Reissue of:
(64) Patent No.: 6,155,079
Issued: Dec. 5, 2000
Appl. No.: 09/244,026
Filed: Feb. 4, 1999

(30) Foreign Application Priority Data

Feb. 5, 1998 (FR) ..... 98 01346

(51) Int. Cl.[7] ..... F25J 1/00
(52) U.S. Cl. ..... 62/643; 62/656; 62/657
(58) Field of Search ..... 62/643, 656, 657

(56) References Cited

U.S. PATENT DOCUMENTS 4,734,114 A * 3/1988 Tasaka et al. ..... 62/656
5,244,489 A * 9/1993 Grenier ..... 75/466
5,538,534 A * 7/1996 Guillard et al. ..... 75/466
5,802,875 A * 9/1998 Drnevich ..... 62/656

* cited by examiner

*Primary Examiner*—Ronald Capossela
(74) *Attorney, Agent, or Firm*—Young & Thompson

(57) ABSTRACT

The plant comprises, on site, a compressed-air provision and distribution system ($L_A$) with at least one dedicated air compressor (CO2, CO3), an air-gas production and provision system ($L_G$) comprising an air treatment unit (S), with a reservoir R of the said air gas and normally fed by a compressor (CO1). In temporary operating mode, with one air compressor (CO2) off-line, the compressed air from the compressor (CO1) of the air gas provision system (S) is at least in part diverted (C), typically with pressure reduction (D), to sustain the production of the compressed air system ($L_A$), the air gas then being at least in part provided by the reservoir (R).

16 Claims, 2 Drawing Sheets

COMBINED PROCESS AND PLANT FOR PRODUCING COMPRESSED AIR AND AT LEAST ONE AIR GAS

Figure 1:
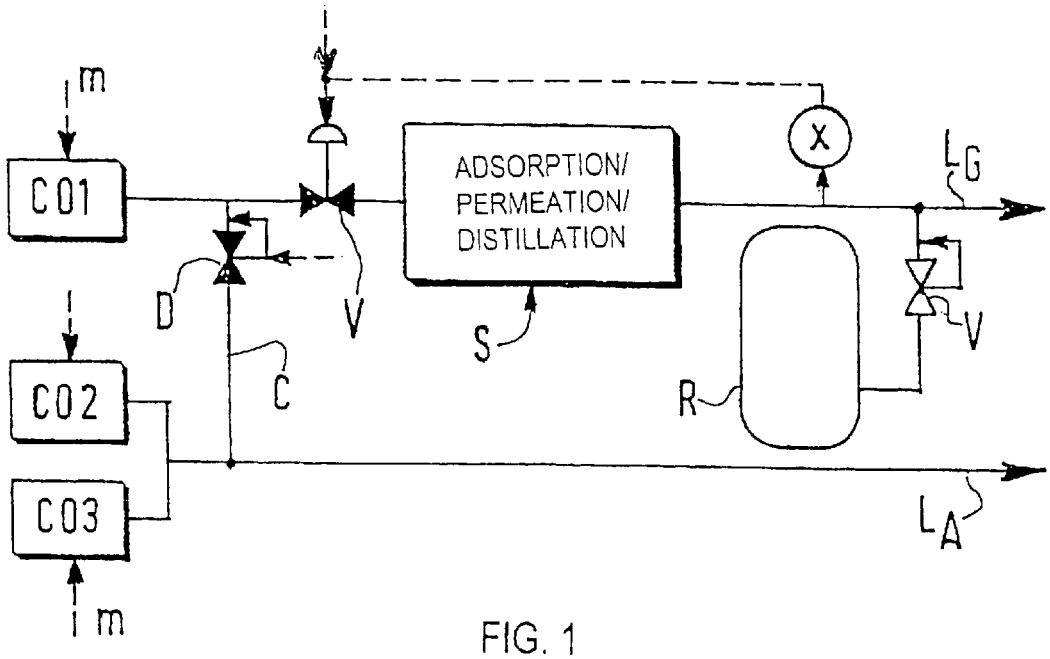

Matter enclosed in heavy brackets [ ] appears in the original patent but forms no part of this reissue specification; matter printed in italics indicates the additions made by reissue.

BACKGROUND OF THE INVENTION

Almost all industries currently have at least one compressed-air network for providing compressed air to all types of machines or devices.

Many industries furthermore employ air gases provided by distribution networks, reservoirs or on-site production plants.

As a general rule, the systems for producing and providing compressed air and air gas are separate and independent, and run by different operators.

In the particular field of metallurgy, it has been proposed, in particular in documents U.S. Pat. Nos. 5,538,534 and 5,244,489, in the name of the Applicant Company, to employ a common compression group for the provision of compressed air to metal processing devices, on the one hand, and to an air-gas separation unit, on the other hand.

SUMMARY OF THE INVENTION

The object of the present invention is to provide a combined method and plant for producing and providing compressed air and at least one air gas, forming a synergy between the systems for producing and providing these fluids and making it possible to reduce investment and running costs while guaranteeing satisfactory security of the gas provision.

To this end, according to one characteristic of the invention, the process comprises the steps of generating, in nominal operating mode, at least a first and a second air flow which are assigned respectively to the provision of compressed air and the production of the air gas, and, in temporary operating mode, of assigning at least a part of the second air flow to the provision of compressed air.

According to the invention, a combined plant comprises a compressed-air provision system connected to at least a first pressurized-air source, and at least one system for producing and distributing at least one air gas which is normally connected to at least one second pressurized-air source, and means for at least temporarily switching the second pressurized-air source to the compressed-air provision system.

Thus, according to the invention, the networks for compressed air and air gas can be interconnected so as to make it possible to share the pressurized-air capacities available on site according to compressed-air demand and gas demand, making it possible to reduce the investment in pressurized air sources, typically compression units, as well as the electrical power installed and consumed, while guaranteeing increased production flexibility.

According to the invention, the priority for assigning pressurized air is given to the compressed-air provision system since compressed air is difficult to store for providing large or prolonged flow rates, whereas the air gas can be readily stored, in particular to pre-existing back-up reserves and the user systems can often make do with a reduced level of production from the air-gas production system, possibly supplemented by the reserves.

First, according to a particular characteristic of the invention, in temporary operating mode, the air gas is provided at least in part by a reservoir of the gas, typically stored in liquid form.

According to a more particular characteristic of the invention, in temporary operating mode, the second flow is assigned in full to the provision of compressed air, the switching means comprising means for isolating the gas production system from the second source which is thus assigned to the air provision.

BRIEF DESCRIPTION OF THE INVENTION

Figure 2:
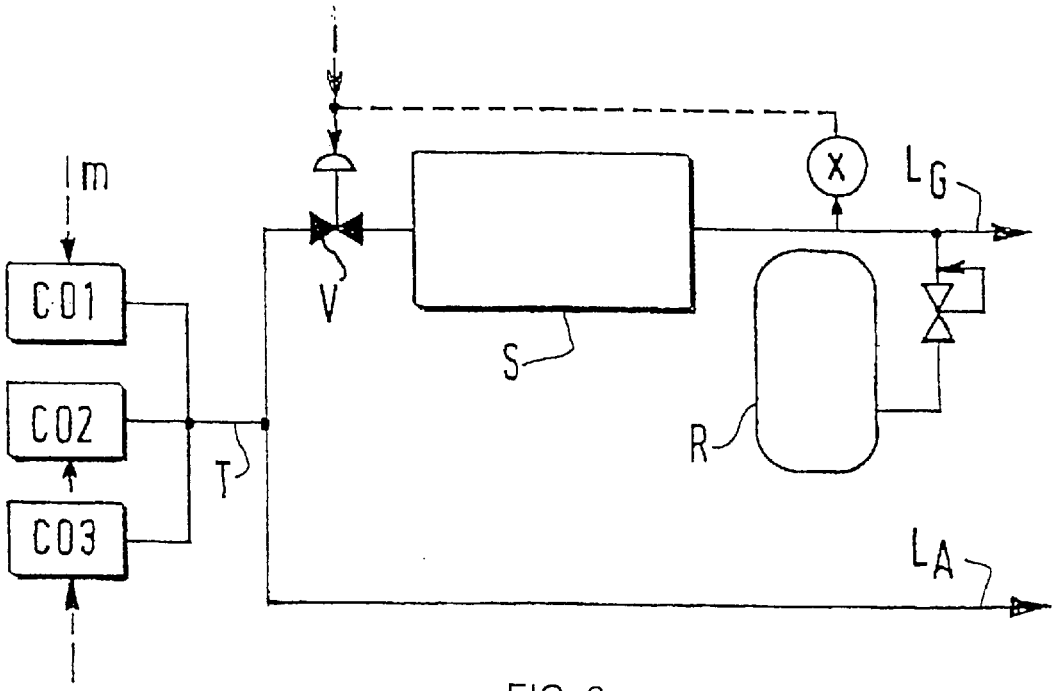
Figure 3:
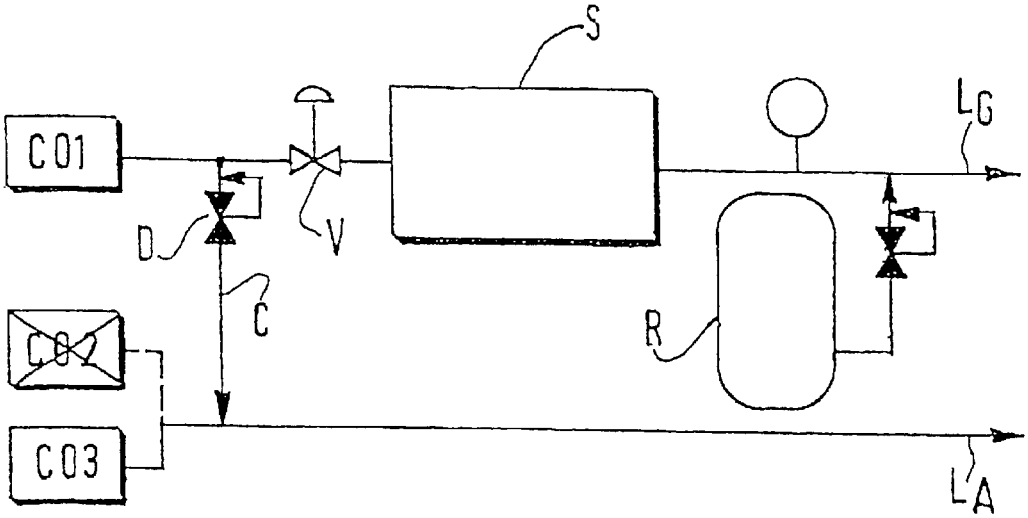
Figure 4:
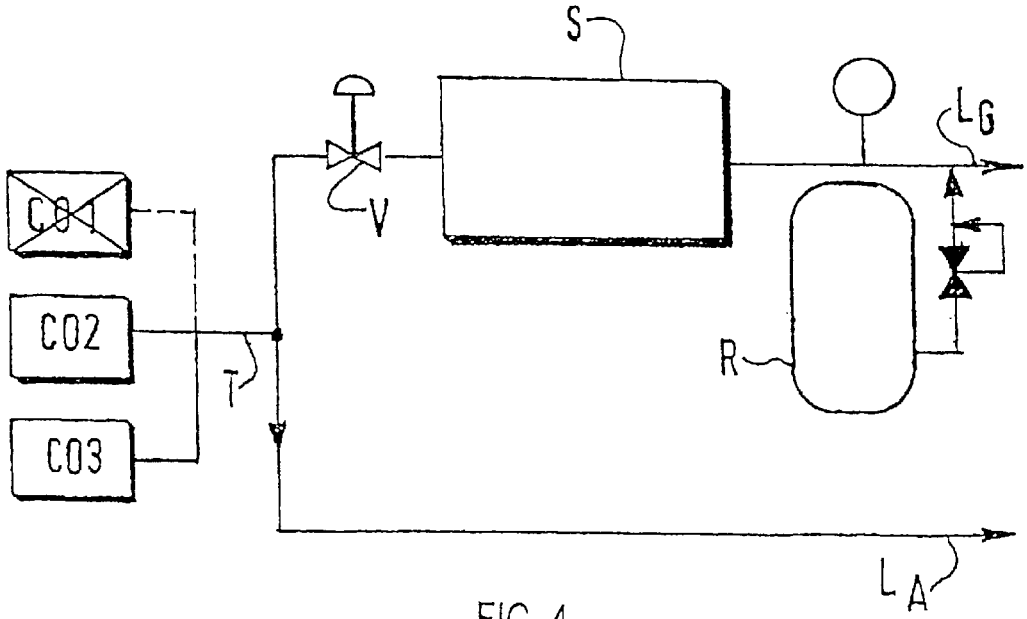

Other characteristics and advantages of the present invention will become apparent from the following description of embodiments which is provided by way of illustration and without implying any limitation, and is given with reference to the appended drawings, in which, FIG. 1 is a schematic view of a first embodiment of a combined plant according to the invention;

FIG. 2 is a similar schematic view of a second embodiment of a combined plant according to the invention; and FIGS. 3 and 4 respectively illustrate the configurations of the plants in FIGS. 1 and 2 in temporary operating mode.

DETAILED DESCRIPTION OF THE INVENTION

The example in FIG. 1 represents at least one line $L_A$ of a network for distributing compressed air provided by two pressurized-air sources CO2, CO3, for example two identical or different parallel compression units.

Also represented is at least one $L_G$ of a network for distributing at least one air gas provided, by separating or treating compressed air originating from at least one pressurized-air source CO1, typically an air compression unit, in a unit for separating or treating air S and/or at least one reservoir R containing the gas, typically in at least partially liquid form, connected to the line $L_G$ by a valve sensitive to the pressure V and/or another controlled valve. The pressure of the air provided by the source CO1 to the system is typically higher than the provided by the sources CO2 and CO3 to the line $L_A$.

According to the invention, a line C, advantageously provided with a control and pressure-reducing valve D, allows connection to be established selectively between the upstream parts of the lines $L_G$ and $L_A$.

In normal or nominal operation, at least the conduit $L_G$ is fed with air gas separated or treated in the unit S, itself fed with pressurized air originating from the source CO1, the reservoir R not normally being made to contribute, except possibly in the event of a demand peak in the conduit $L_G$. In parallel, the line $L_A$ is fed with pressurized air originating from at least one of the sources CO2, CO3. If one of these sources CO2, CO3 malfunctions, as represented in FIG. 3, at least a part of the air flow originating from the source CO1 is sent, typically with reduced pressure or stepped down by controlling the source CO1, via the line C to the line $L_A$ in order to maintain the requisite compressed-air flow in the latter. If need be, the unit S may be at least partially isolated upstream by a control and/or isolation valve V, the unit S operating in this case at a reduced level, the air gas in the line $L_G$ being provided fully or in part by the standby reserve in the reservoir R so that the valve V may be manually controlled, synchronized with the actuation of the valve D, or actuated in response to at least one output parameter of the system S, typically the flow rate and/or the pressure of the air gas in the line $L_G$.

FIG. 2 represents an embodiment in which the separation unit S operates with a pressurized air feed pressure substantially identical to that of the compressed air in the network $L_A$. In this case, the three sources CO1, CO2, CO3 deliver into the same conduit T, from where the pressurized air is distributed to the compressed-air network $L_A$ and to the separation unit S for provision to the line $L_G$. If one of the sources COi malfunctions typically if one compressor (CO1 in FIG. 4) is shut down, the remaining sources CO2, CO3 are fully assigned to the provision of compressed air to the line $L_A$, the valve V being closed and isolating the system S, and the gas reserve in the reservoir R stepping in to ensure the provision of air gas in the line $L_G$.

The separation or treatment unit S is at least in part of the type with cryogenic distillation and/or of the type with a permeation membrane and/or of the type with pressure swing adsorption for the provision of nitrogen and/or oxygen-enriched air and/or pure oxygen and/or dehydrated and, if appropriate, decarbonated dry air, and is capable of operating, on request or automatically according to the gas demand, in at least one reduced running status, thus making it possible to reduce its compressed-air consumption.

In the case when the pressurized-air sources COi are independent compressors, they are generally provided with means in for control and/or automatic regulation (idling, shutdown, flow-rate adjustments, etc.) which make them adapt to the instantaneous requirements of the air lines $L_A$ and/or the unit S, thus making it possible to optimize the energy consumption.

Furthermore, coupling according to the invention makes it possible to obtain a lower running level for the air gas production with an energy saving because the excess air available for the separation can in part be fed back to the compressed-air network, with a corresponding reduction in the power consumed by the compressors normally assigned to this compressed-air network.

Advantageously, to this end, a system will be provided for controlling the compressed-air sources which can alter the air flow rates which are provided, as a function of the pressure and/or flow rate which are desired in one or other of the lines, for example by idling or shutting down some of the compressors, or reducing their flow rate.

By way of example, with a unit S of the cryogenic-distillation type for providing nitrogen, a combined plant according to FIG. 1, with a compressor CO1 capable of making up for the malfunction or interruption for maintenance of one of the compressors in the pair CO2, CO3, makes it possible to reduce the investment and installed power for the air compressed by close to 25% and to optimise the specific energy during the phases of producing nitrogen at a reduced running level.

Although the present invention has been described with reference to particular embodiments, it is in no way limited by this, and it may moreover receive modifications and variations which occur to the person skilled in the art in the scope of the claims below.

Thus, instead of two sources in parallel, a single air source may be provided, for example a variable-speed compressor, with at least one pressurized-air storage vessel, which can simultaneously feed, if appropriate with partial pressure reduction, the two networks or only one of them at the required pressure. Similarly, in particular when the flow rates needed for the two networks are relatively close to one another, a set of over-engineered compressors whose maximum service pressure is greater than that which the compressed-air network alone would need, may be installed according to their approach in FIG. 2, with a set of valves making it possible to direct the air production of the various compressors to one or other of the networks, thus making it possible to reduce the energy costs and greatly optimise the equipment maintenance.

Furthermore, although as a general rule the lines $L_A$ and $L_G$ supply sites which are common in part, they may also supply, at least in part, one or more of the sample plants on a given site, for example burners or combustion units, waste processing units, in particular employing ozonizers fed with air and/or oxygen, or more generally any plant using at least one air gas and employing at least one item of equipment or instrument using compressed air, where appropriate dehydrated, by passing it through a unit S of the drier type, using a membrane and/or using adsorption.

What is claimed is:

1. A method of producing and supplying compressed air to at least one compressed air distribution system and at least an air gas to at least one air gas distribution system, the air gas processed from air in at least one air treatment unit, comprising:

in a first operating mode, generating at least a first flow of compressed air and a second flow of compressed air, the first flow of compressed air being supplied to the compressed air distribution system, the second flow of compressed air being supplied to the air treatment unit for producing said air gas; and in a second temporary operating mode, supplying at least part of the [first] *second* flow of compressed air to the compressed air distribution system.

2. The method according to claim 1, further comprising operating separately at least a first compressed air generator and a second compressed air generator for generating said first and second flows of compressed air.

3. The method according to claim 2, wherein in the second temporary operating mode, one of the first and second compressed air generators is operated at a reduced or null production rate.

4. The method according to claim 1, wherein in the second temporary operating mode, the entire first flow of compressed air is supplied to the compressed air distribution system.

5. The method according to claim 4, wherein in the second temporary operating mode, the air gas supplied to the air gas distribution system is delivered from a reservoir of said air gas.

6. The method according to claim 1, wherein in the second temporary operating mode, the air treatment unit is operated in an idle mode.

7. The method according to claim 1, wherein the air gas is nitrogen.

8. The method according to claim 1, wherein the air gas is oxygen.

9. The method according to claim 1, wherein the air gas is dried air.

10. An installation comprising:

at least one compressed air distribution system normally connected to at least a first compressed air generator supplying a first compressed air flow;

at least one air gas distribution system for supplying at least one air gas and including at least one air treatment unit having an air inlet normally connected to at least a second compressed air generator supplying a second compressed air flow; and flow switch means for at least temporarily addressing at least part of the [first] *second* compressed air flow to the [air inlet of the air treatment unit] *compressed air distribution system*.

11. The installation according to claim 10, wherein the flow switch means includes valve means.

12. The installation according to claim 10, wherein the air gas distribution system includes at least one reservoir containing said air gas.

13. The installation according to claim 10, wherein said first and second compressed air generators are separate air compression units.

14. The installation according to claim 10, wherein the air gas distribution system comprises at least one air treatment unit which is at least in part an adsorption unit.

15. The installation according to claim 10, wherein the air gas distribution system comprises at least one air treatment unit which is at least in part a permeation membrane.

16. The installation according to claim 10, wherein the air gas distribution system comprises at least one air treatment unit which is at least in part a cryogenic distillation unit.

* * * * *